US 6,687,217 B1

(12) United States Patent
Chow et al.

(10) Patent No.: US 6,687,217 B1
(45) Date of Patent: Feb. 3, 2004

(54) METHOD OF AND SYSTEM FOR ONE PLUS ONE PROTECTION FOR RADIO EQUIPMENT

(75) Inventors: Peter El Kwan Chow, Orlando, FL (US); Jeff Keit Van Truong, Oviedo, FL (US)

(73) Assignee: Carriercomm, Inc., Santa Barbara, CA (US)

( * ) Notice: Subject to any disclaimer, the term of this patent is extended or adjusted under 35 U.S.C. 154(b) by 0 days.

(21) Appl. No.: 09/304,674

(22) Filed: May 4, 1999

(51) Int. Cl.$^7$ .................................................. H04J 3/14
(52) U.S. Cl. ........................................ 370/217; 370/219
(58) Field of Search ................................. 370/217, 219, 370/220, 225; 455/135; 375/358

(56) References Cited

U.S. PATENT DOCUMENTS

| | | | | |
|---|---|---|---|---|
| 5,708,684 A | * | 1/1998 | Ueda ........................... | 375/358 |
| 5,761,245 A | * | 6/1998 | Haukkavaara et al. ....... | 370/225 |
| 5,809,406 A | * | 9/1998 | Taki et al. ................... | 455/135 |
| 6,111,852 A | * | 8/2000 | Leung et al. ................ | 370/217 |
| 6,169,726 B1 | * | 1/2001 | Dempsey et al. ............ | 370/219 |

FOREIGN PATENT DOCUMENTS

JP          1-288119 A1  *  11/1989  ................. 455/8

* cited by examiner

Primary Examiner—Salvatore Cangialosi
(74) Attorney, Agent, or Firm—Fulbright & Jaworski L.L.P.

(57) ABSTRACT

A method of and apparatus incorporating 1+1 protection in a point-to-point radio system includes redundant microwave radio transceiver pairs, each transceiver including identical controls for identifying faults and reconfiguring to accommodate failures. Each transceiver includes receiver and transmitter monitoring circuitry for detecting a loss of received signal or transmitted signal, respectively. Fault signals are generated in response to loss of signal which are then processed by a designated master processor implementing a set of rules for identifying a likely failure corresponding to the faults detected. According to the rule, a partial loss of received signal by one of the receivers indicates a failure of that receiver, while loss of signal by both receivers is interpreted as a failure of the corresponding far-end transmitter. Conversely, receipt of a loss of signal message from a far-end radio station is interpreted as a failure of the active transmitter or the master controller. In response, the hot standby transceiver is brought online, the active transceiver is placed in a standby mode, and the appropriate maintenance facilities are notified. In addition to activating the standby transceiver of the pair experiencing the failure, the communication system may be configured to initiate a similar changeover at the far-end site to maintain particular radio links, or, may initiate a corresponding changeover in a mated redundant pair at the same location so as to maintain a particular rooftop radio pair correspondence.

58 Claims, 9 Drawing Sheets

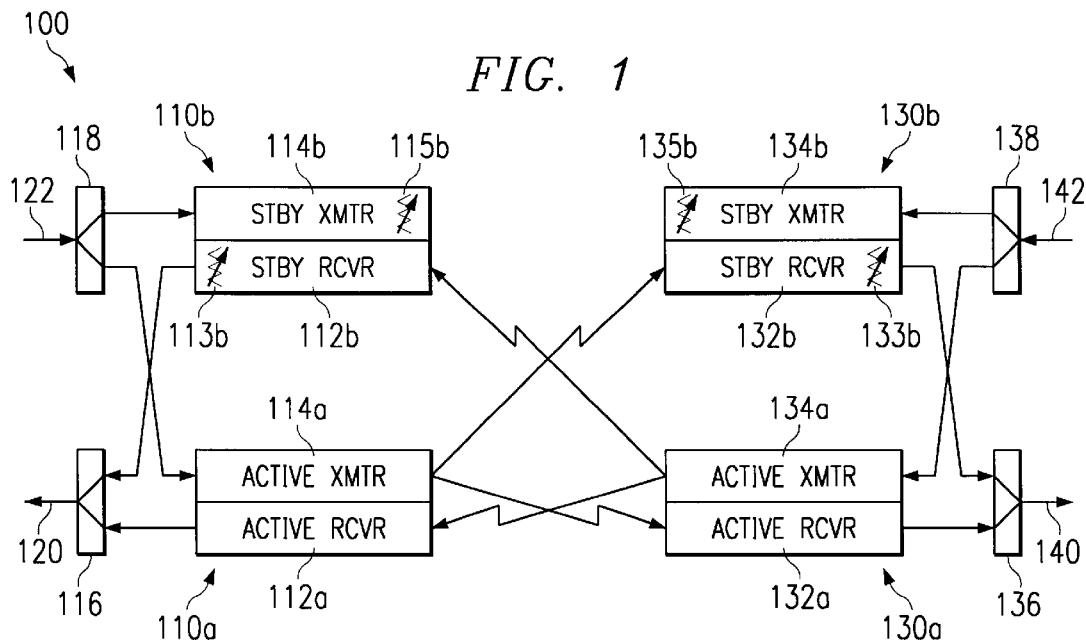

FIG. 1

| FAULT STATUS | | CONCLUSION |
|---|---|---|
| NEAR END | FAR END | |
| LOSS OF SIGNAL AT BOTH RECEIVERS (ACTIVE AND STANDBY RECEIVER FAULTS) | UNKNOWN TRANSMITTER STATUS | FAR-END TRANSMITTER FAULT |
| LOSS OF SIGNAL AT ONLY ONE OF RECEIVERS (ACTIVE RECEIVER) | UNKNOWN TRANSMITTER STATUS | NEAR-END ACTIVE RECEIVER FAULT |
| LOSS OF SIGNAL AT ONLY ONE OF RECEIVERS (STANDBY RECEIVER) | UNKNOWN TRANSMITTER STATUS | NEAR-END STANDBY RECEIVER FAULT |
| ACTIVE TRANSMITTER FAULT | LOSS OF SIGNAL BY BOTH FAR-END RECEIVERS (FAR END ACTIVE AND STANDBY RECEIVER FAULTS) | NEAR-END TRANSMITTER FAULT |
| CRITICAL FAILURE OTHER THAN LOSS OF SIGNAL REPORTED ONLY AT THE ACTIVE TRANSMITTER AND NO ALARM REPORTED BY STANDBY TRANSMITTER | LOSS OF SIGNAL AT BOTH FAR-END RECEIVERS | NEAR-END ACTIVE TRANSMITTER FAULT |

FIG. 2

METHOD OF AND SYSTEM FOR ONE PLUS ONE PROTECTION FOR RADIO EQUIPMENT

REFERENCE TO RELATED APPLICATIONS

Reference is made to the following commonly assigned U.S. patent application entitled "COMMERCIAL NETWORK BASED ON POINT TO POINT RADIOS", Ser. No. 09/245,701, filed Feb. 6, 1999 now U.S. Pat. No. 6,366,584, the disclosure of which is incorporated herein by reference.

TECHNICAL FIELD

This invention relates to radio systems, and more particularly, to wireless communication apparatus and systems incorporating such apparatus providing a 1:1 facility protection.

BACKGROUND

The reliability of modern electronic devices has steadily improved as has our dependence on those devices. However, while highly reliable, these devices are not immune from failure resulting from a host of predictable and unpredictable causes and events. Various techniques are used to address the failures inevitable in all systems, and particularly in mission-critical apparatus and systems. For example, certain apparatus and systems incorporate built-in test (BIT) facilities and/or built-in test equipment (BITE) to evaluate apparatus performance, identify impending and actual failures and performance degradation conditions, and isolate, reconfigure and/or bypass around failed or malfunctioning equipment. Such systems may additionally notify appropriate personnel to take corrective action to restore system performance and facilities.

Reliability is a particularly critical issue in communications systems which support multiple users. Failure of a network component at a critical node in a network may disable all communications along the network or severely impede or limit communications along or between segments of the network. Even if a graceful degradation plan is in effect, such failures often limit available bandwidth supported by the remaining network facilities that are still in operation.

One common way to address equipment failures is to provide redundancy on, for example, a 1:1 or 1:n protection basis at the equipment level at communication nodes. For example, a 1:1 or 1:n module protection scheme uses redundant circuit packs within a radio, switching to a standby pack upon detecting failure of an active circuit.

In a "cold" standby configuration, the replacement circuit is not powered until fault detection. Cold standby saves power, wear on the standby and associated circuitry, and the addition of support circuitry required to maintain the redundant standby circuitry in a power-up mode, e.g., additional power supply capacity output terminations such as dummy loads, control circuitry, cooling, etc. Conversely, cold standby requires more time to bring the replacement "on-line" and risks that the replacement may be inoperative when powered up. Alternatively, the redundant circuitry may be maintained in a "hot" standby condition so that it can be quickly and automatically substituted for the failed circuit pack or module. To further expedite this transition, the hot standby can be operated in lock-step or an "errorless" condition so that it works in parallel and synchronously with the operational unit which it backs up. A monitor system can then detect the failure and switch over to the backup unit so that the transition is virtually errorless and transparent to system users.

At a system level, these protection systems may require auxiliary processing equipment to monitor the operational equipment, identify and locate faults, and command appropriate actions to activate and substitute backup equipment for failed units. This means that the redundancy equipment must interface with the equipment being monitored, requires deployment of additional systems, and can create another failure opportunity to bring the system down. Using discrete redundancy control systems also means that additional spares must be kept on hand, increasing costs and complicating logistics.

Accordingly, a need exists for a communication system having high reliability and self-diagnostics. A further need exists for a communication system which automatically reconfigures to replace failed units and maintain network service. A further need exists for communication equipment which incorporates facilities to accomplish network reconfiguration without requiring auxiliary equipment.

SUMMARY OF THE INVENTION

The present invention is directed to wireless communication equipment, preferably microwave radio (i.e., 1 GHz and above) equipment, and systems incorporating such equipment, including a method of operating such equipment and systems, which incorporates and integrates built-in test facilities into each radio which, when integrated into a wireless link, such as those of a radio network shown and described in the above referenced patent application entitled "COMMERCIAL NETWORK BASED ON POINT TO POINT RADIOS", automatically form a system level fault detection and isolation facility. A preferred embodiment of the invention provides built-in test and redundancy control functionality into each active and standby radio in the form of redundancy modules which cooperate to identify faults, reconfigure to replace failed radios, communicate with the rest of the network to identify failed radios in remote nodes, and notify maintenance facilities that a failure has occurred. Preferably, each redundancy module includes a set of rules for identifying and locating failures occurring at the radio module unit, mated radio pair, node and system levels. According to the preferred embodiment, since each redundancy module implements the same rule set and redundancy processing, radio replacement is easily accomplished.

According to one object of the invention, a protection switching method and apparatus is provided wherein the processing to identify a fault and provide appropriate corrective action is incorporated within a radio and is preferably provided within each radio. Further, no auxiliary or external system is required for functioning of the system other than a passive coupler to provide simultaneous inputs to and outputs from the redundant radio pair. Thus, no external control logic is required.

According to one aspect of the invention, minimal network disruption is caused during a changeover by using a hot standby redundancy.

According to another aspect of the invention, a radio communication device, preferably a transceiver although receiver and transmitter circuitry may be utilized discreetly according to the present invention, for use as one of a pair of redundant communication devices forms part of a first communication site. The first communication site is in radio communication with a second communication site of the communication system. The radio communication device, described here with reference to a transceiver embodiment to facilitate discretion of both receive and transmit redundancy, preferably includes a radio transmitter selectively operating in an active and standby mode of operation and a radio receiver. According to a feature of the invention, the radio receiver is also operative in either standby or active modes of operation. The radio transceiver further includes a receiver monitor which is responsive to the radio receiver to detect a failure of a transmitter of a pair of remote transceivers located at the second communication site. The radio transceiver also includes a controller which controls the radio transmitter to operate in the active and standby modes of operation in response to the pair of remote transceivers detecting a failure of one of the pair of redundant radio transceivers. The controller is also responsive to the receiver monitor and to a similar signal received from a receiver monitor of the other radio transceiver of the pair of redundant radio transceivers so as to supply a transmitter failure signal to the remote pair of radio transceivers located at the second communication site. Accordingly, the controller preferably includes facilities for detecting a local transmitter failure in response to a remote site's loss of signal and to identify a local receiver failure in response to only one of the local receivers experiencing a loss of signal. Conversely, the controller provides a remote transmitter failure signal in response to a loss of received signal by both local receivers.

According to a feature of the invention, a preferred embodiment radio receiver or transceiver includes an output for selectively providing a signal from the radio receiver in response to (i) a receiver monitor and/or (ii) a signal from the receiver monitor of the other transceiver of a redundant pair.

According to another feature of the invention, a preferred embodiment radio transmitter or transceiver includes a transmitter monitor for detecting an output of the transmitter, the controller being responsive to the transmitter monitor for providing a control signal to the other of a redundant pair.

According to another feature of the invention, a preferred embodiment transmitter of transceiver includes a dummy load selectively attenuating or terminating an output of the radio transmitter when the transmitter is operated in the standby mode of operation, i.e., the radio transmitter operating in standby node is not RF transmitting.

According to another aspect of the invention, a radio transceiver system for use at a communications node of a radio communications system preferably includes first and second radio transceivers, although it shall be appreciated that the aspects of the present invention described may be utilized in conjunction with a received and/or transmitter system for use at a communications node rather than a transceiver, if desired. Each of the radio transceivers includes a radio transmitter selectively operable in standby and active modes of operations and a radio receiver. Also included as part of each radio transceiver is a controller which is preferably operative to monitor the receiver and, in response, provide a receiver status indicator. The preferred embodiment controller also provides a remote transmitter failure signal responsive to the receiver status indicator and to the receiver status indicator of the other transceiver of the pair. The preferred embodiment controller is also operative to control the transmitter to selectively operate in the standby and active modes of operation in response to a remote transmitter failure signal received from an associated remote redundant radio transceiver system.

According to a feature of the invention, the preferred embodiment controllers of the first and second radio transceivers forming the pair are in communication to operate one of the controllers in a master mode for providing the remote transmitter failure signal, while the other controller is operated in a slave mode for providing a respective receiver status indicator to the controller which is being operated in the master mode.

According to another feature of the invention, the preferred embodiment receiver status indicators include a loss of signal condition. One of the controllers of the pair of radio transceivers receives the receiver status indicator of the other radio transceiver and, in response to the received indicator and the indicator of that transceiver (i.e., the receiver status indicators of both the first and second transceiver), the controller determines the type of failure according to application of a predetermined rule. According to this aspect of the invention, the controller may determine that there has been a failure of the transmitted signal in response to the receiver status indicators of both remote radio transceivers indicating that there was a loss of signal, i.e., both indicating a loss of signal condition. On the other hand, the controller would determine that there had been a failure of a local receiver associated with one of the local radio transceivers and, in particular, the transceiver corresponding to the loss of signal indicator, if the status indicator of one of the transceivers does not indicate a loss of signal.

According to another aspect of the invention, a communication system includes a plurality of nodes. At least one of the nodes includes first and second pair of redundant radio transceivers (although radio receivers and/or transmitters may be utilized if desired) in radio communication with respective remote nodes of the system, i.e., a previous node and a subsequent node of a network as shown and described in the above referenced patent application entitled "COMMERCIAL NETWORK BASED ON POINT TO POINT RADIOS". Each of the pair of redundant radio transceivers preferably includes a transmitter selectively operable on a standby and an active mode of operation and a receiver. According to a feature of the invention, the receiver may likewise be operable in either an active or standby mode. The radio transceiver also preferably includes a controller operative in master and slave modes to selectively (a) monitor the receiver portion of the radio transceiver and, in response, provide a receiver status indicator, and (b) provide a remote transmitter failure signal in response to the receiver status indicator and to a receiver status indicator of the other one of the pair of redundant radio transceivers. The controller further (c) controls the operating modes of the transmitters of the pair of redundant radio transceivers to selectively operate in the standby and active modes in response to a remote transmitter failure signal provided by an associated one of the previous and/or subsequent nodes.

According to a feature of the invention, one of the pair of redundant radio transceivers is preferably selectively operated in an active mode of operation while the other one of the pair is operated in a standby mode of operation. The "active" transceivers of each pair of radio transceivers are connected to communicate data such as between a previous and a subsequent relay node of the communication system or between a previous subsequent relay node and a termination device coupled to the active transceiver.

According to another aspect of the invention, a method of operating a radio communication network is described where the network includes a plurality of nodes, each node including first and second pairs of radio transceivers wherein one radio transceiver of each of the pairs is operated in an active mode and the other in a standby mode. The method preferably includes the steps of identifying signals transmitted to ones of the first and second pairs of transceivers and determining an operational status of a receiver portion of each of the transceivers of the first and/or second pairs of radio transceivers in response to a dissimilarity of signals identified by the respective pairs of radio transceivers. That is, a loss of signal indicator from only one of the receivers of a redundant pair is indicative of a failure of that receiver rather than a failure of the associated remote transmitter to transmit a signal. The method further includes determining an operational status of a remote node (i.e., the remote transmitter) in response to a failure to receive a signal from the remote node by an associated one of the pair of transceivers, and selectively changing the operating mode of one of the pair of transceivers in response to such determination. That is, as a consequence of determining a failure at either the remote transmitter, or one of the local receivers, the appropriate backup transceiver, or portion thereof, will be preferably activated and substituted for the failed unit identified according to the method.

According to another aspect of the invention, a method of operating a radio communications network is provided for the operation of first and second terminal nodes and an intermediate relay node (although referenced herein as a "relay node", it shall be appreciated that such a node may in fact not only provide throughput of data as between a series of links in a network, but may also identify and direct data to termination equipment coupled thereto). The first and second terminal nodes each include a pair of radio transceivers while the relay node comprises two (back-to-back) pairs of radio transceivers. One radio transceiver of each of the pairs is operated in an active mode while the other is maintained in a standby mode (preferably a hot standby mode). Another aspect preferably includes the steps of detecting an alarm condition caused by a loss of signal by one radio transceiver of the pair and interrogating the other radio transceiver of the pair to identify a corresponding loss of signal by the other radio transceiver. A preferred embodiment of the method then applies a predetermined rule to determine whether a receiver or transmitter failure has most likely occurred and switches operation modes of one of the pairs of radio transceivers in response to the determination. According to a feature of the invention, the method also includes the step of transferring control of one of the pair of transceivers, e.g., redesignating to the active transceiver the master control function for the pair.

These, together with other objects and advantages which will be subsequently apparent, reside in the details of construction and operation as more fully hereinafter described in the claims, with reference being had to the accompanying drawings forming a part thereof, wherein like numerals refer to like elements throughout.

BRIEF DESCRIPTION OF THE DRAWING

FIG. 1 is a block diagram of back-to-back pairs of redundant radio transceivers forming a radio relay station or node;

FIG. 2 is a table of a fault isolation rules used to identify radio transceiver failure conditions;

DETAILED DESCRIPTION

Figure 3:
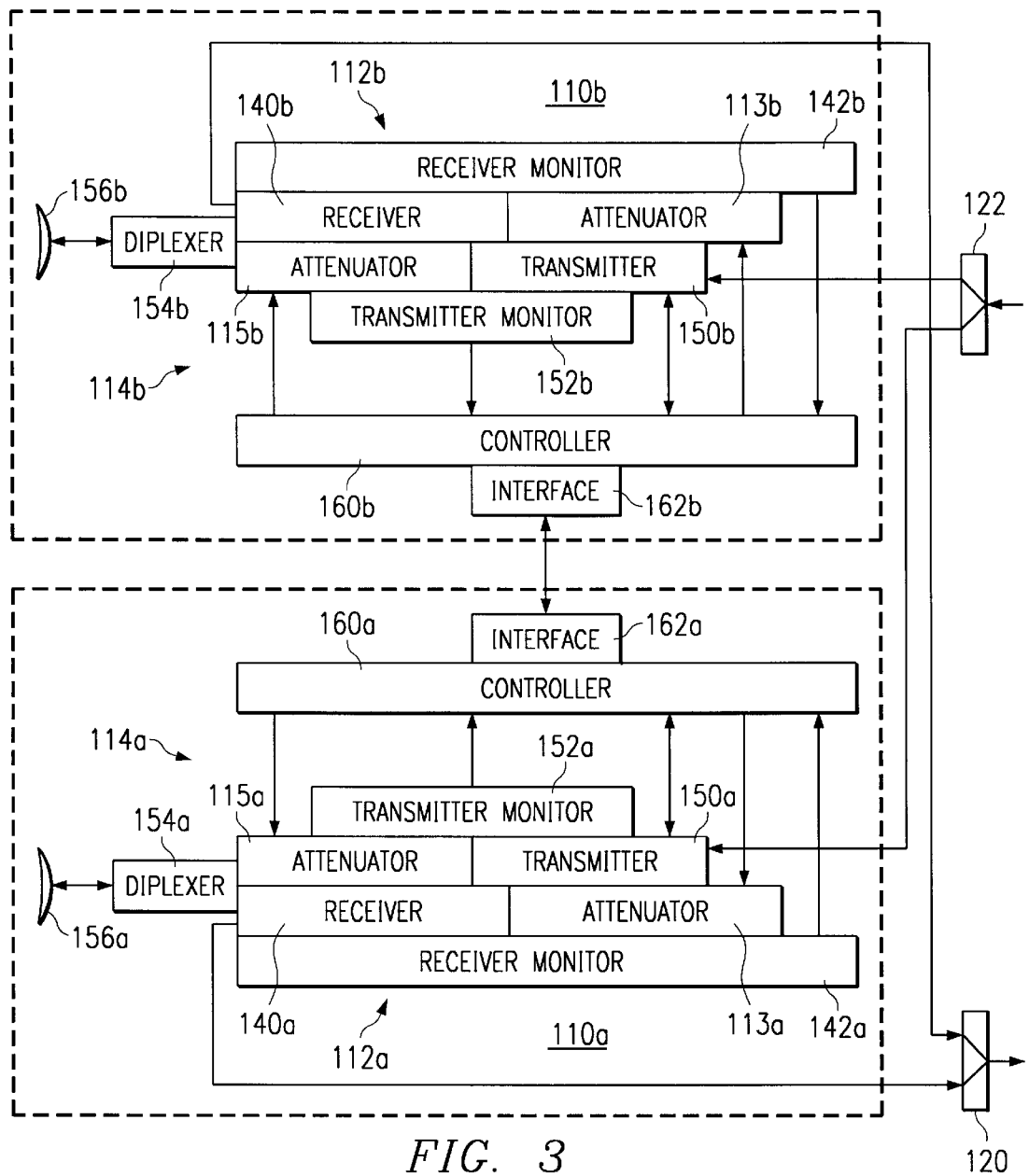
FIG. 3 is a block diagram of a redundant pair of radio transceivers.

Referring to FIG. 1, communication system radio network node or relay station 100 of a preferred embodiment includes redundant pairs of microwave radio transceivers 110a, 110b and 130a, 130b. It should be appreciated that the term "transceiver" is used herein to include pairs of radio transmitters and/or receivers whether or not sharing or having any common circuitry. For example, discrete radio receiver units and radio transmitter units may be deployed to provide transceiver functionality, if desired. Moreover, there is no limitation to the present invention operating with transceiver functionality. As one of ordinary skill in the art will readily appreciate, aspects of the present invention may be utilized with a node having only a radio receiver or transmitter and a far end node having only a corresponding transmitter or receiver, if desired. Of course, in such embodiment of the present invention reverse channel link, such as a control channel link, may be desired for communication of control instructions, interrogation of equipment, reporting of faults or conditions, or the like. Accordingly, such an embodiment may employ a reverse channel link such as through a secondary network, such as a local area network (LAN), wide area network (WAN), the Internet, a cable system, or the like, or even by establishing communications such as on demand through a public switched network (PSN).

Each redundant pair of the embodiment of FIG. 1 includes one radio transceiver operated in an active mode, while the other is in a hot standby mode. Thus, the incoming baseband signal to each pair of redundant radio transceivers as shown at 122 and 142 is preferably split by respective passive couplers 118 and 138 into two input signals that are connected to both active transmitters 114a and 134a of each pair and to the corresponding standby transmitters 114b and 134b of each pair. This allows for the redundancy of the present invention to be provided without the need for external active components. Moreover, according to a preferred embodiment, the transceivers of the present invention are functionally identical, i.e., each provides the control functionality described herein, allowing for economy of manufacturing and stocking, as well as enabling simplified replacement. For example, if a radio unit in one transceiver of a redundant pair malfunctions, that radio unit may be disabled, or placed in standby mode, completely, including any control functionality, allowing the other radio unit to assume all operation functionality. The malfunctioning unit may be easily replaced by service personnel without any interruption of service.

Additionally, or alternatively, the radio units of the present invention may be adapted to removably accept circuitry providing the redundancy control of the present invention. Accordingly, radio units may be economically manufactured and stocked to service both fault tolerant redundancy protected and unprotected installations, with the former having the aforementioned control circuitry installed therein. Similarly, links may be installed with one level of protection, i.e., radio unit redundancy, and later altered to attain another level of protection, i.e., no redundancy. For example, as a ring topology provides redundancy, radio links may initially be installed with redundant radio units which are later removed when full deployment of a ring topology is accomplished. Of course, such altering of protection levels may also be attained by using a single radio unit having the redundancy control circuitry permanently installed therein, but remaining inoperative until a second radio unit of a redundant pair is installed, if desired.

Preferably, both transmitters of each pair, i.e., 114a, 114b and 134a, 134b process the input signal. However, while active radio transmitters 114a and 134a are connected to transmit their respective signals through respective antennas such as directional microwave antennas, the RF signals produced by standby transmitters 114b and 134b are preferably attenuated to a sufficiently low level, or otherwise interrupted or canceled, by output devices 115b and 135b (shown as adjustable attenuations in the preferred embodiment, respectively, to a to avoid interfering with the active radio signal generated by the respective active radio transceiver.

Similarly, both active and standby receivers of each pair of redundant radio transceivers receive the same off-air signal from the associated remote transmitter site. Since each active and associated spare standby receiver processes and recovers the base-band signal from the received RF signal in the preferred embodiment of FIG. 1, it is advantageous to attenuate, or otherwise interrupt or cancel, the receiver output of the standby receiver using devices 113b and 133b (shown as adjustable attenuators in the preferred embodiment), respectively, to avoid interfering with the active radio output signal. The output signal from the active receiver and the attenuated output signal from the standby receiver can then be combined in a passive combiner circuit 116, and 136, respectively, without interference. Alternatively, combiners 116 and 136 may be active combining circuits, which may include adjustable phase shifters or other devices, or may include appropriate logic, such as digital signal processors, for combining the outputs without allowing the signals to destructively interfere or introduce noise.

Although not shown in FIG. 1, active transceivers 110a and 130a also include the capability of activating, such as under control of a controller having a CPU, memory, and operating instruction set, the appropriate circuitry, such as the preferred embodiment attenuation circuitry, so that each may be operated in a standby mode of operation. Accordingly, either transceiver of the redundant pair may be operated in active mode while the other is operated in a standby or fault mode. Additionally, although described with reference to a preferred embodiment as attenuation circuitry, it shall be appreciated that the signal interruption or discontinuation circuitry of the present invention may utilize circuitry in the alternative to or in addition to attenuators. For example, signal cancellers introducing a nulling signal may be used. Likewise, switching circuitry interrupting the signal path may be utilized, such as in combination with a signal material. However, attenuators are used in the preferred embodiment as they may be disposed in the signal path at a point very near the communication of the signal outside of the transceiver and therefore leave "hot" substantially all if the standby transceiver circuitry. Additionally, such attenuators are relatively inexpensive and easily controlled to provide a very good level of signal interruption, i.e., when properly controlled very little of the standby signal is allowed to pass.

FIG. 2 is a table of the logic rules preferably implemented by the active radio transceiver or, during a transition, by the radio transceiver having the master control function. As shown in the table, a loss of signal by both receivers of a redundant pair leads to a conclusion in a preferred embodiment that there has been a fault at the far-end transmitter rather than the other possibilities, such as simultaneous failures of both receivers or a controller fault erroneously identifying active and standby receiver faults. As explained in further detail below, loss of signal by both the active and standby receivers preferably results in a fault message being sent to the far-end radio transceiver pair via the active near-end transmitter or other link. The message to the far-end system may be sent to the far-end system directly on a dedicated or shared control, system overhead or order channel or via a network controller.

The loss of a signal at one, but not both, of the receivers of a redundant pair, preferably leads to a conclusion that the receiver reporting the fault has failed so that any appropriate action can be initiated to restore reception (it should be appreciated that if the loss of signal is at the standby receiver only, then no corrective action may be required other than notifying maintenance as the active receiver is still receiving signal). Failure of the near-end transmitter is indicated in a preferred embodiment by an appropriate fault signal being transmitted by the far-end system upon loss of signal by both of its receivers, that is fault signals being generated by both far-end receivers.

Finally, critical failure only at the active transmitter other than loss of signal, with no alarm reported by the standby transmitter resulting in loss of signal at both far-end receivers indicates a near-end active transmitter fault.

Further details of the transceivers of a preferred embodiment are shown in FIG. 3. In this embodiment transceiver 110a includes a receiver module 112a including a microwave receiver 140a, output attenuator circuit 113a, and a receiver monitor 142a. Transmitter 114a includes a microwave transmitter module 150a, RF output attenuator circuit 115a, and transmitter monitor 152a. The output from transmitter attenuator circuit 115a is provided to diplexer 154a for transmission by directional microwave antenna 156a. A signal received from directional microwave antenna 156a is output to diplexer 154a and provided to the input of receiver 140a.

A controller 160a preferably receives inputs from receiver monitor 142a and transmitter monitor 152a and, via interface 162a, from the other radio transceiver of the redundant pair, radio transceiver 110b. Controller 160a provides control signals to receiver attenuator 113a and transmitter attenuator 115a so that the outputs of respective receiver 140a and transmitter 150a are attenuated when transceiver 110a is being operated in a standby mode and are passed, substantially unattenuated, in an active mode of operation in response to control signals from controller 160a. In an initial operating condition where both transceivers 110a and 110b are available for operation, one is operated in an active mode, its associated controller preferably operating in a master mode of operation although either controller of such a redundant pay may operate in the master mode. The other radio transceiver of the pair is operated in a hot standby condition, its controller in a slave mode for responding to requests from the master controller and providing status reports to the master controller. The master controller performs diagnostic processing for the pair including processing to identify system failures.

Figure 4:
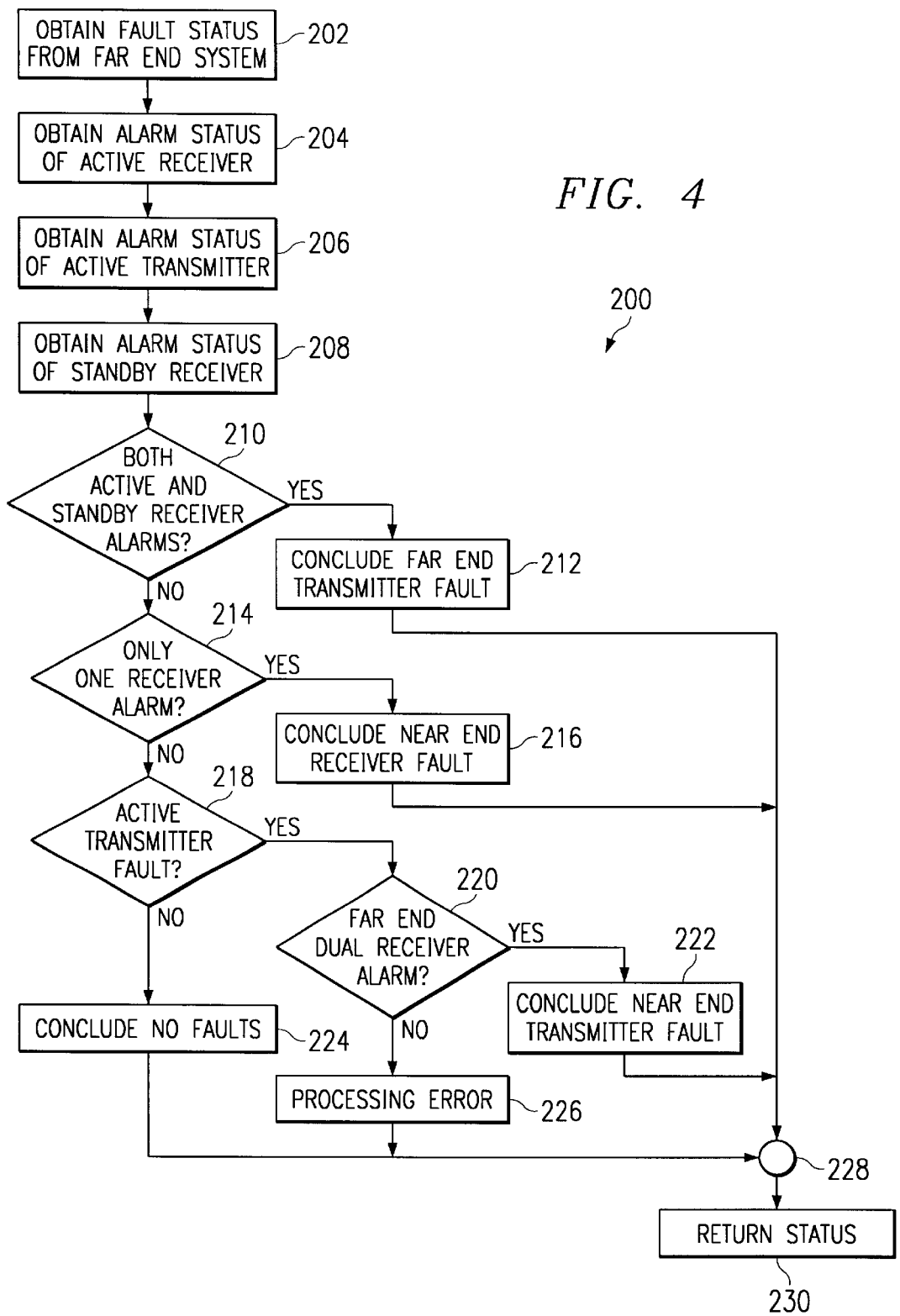
FIG. 4 is a flow diagram implementing a fault identification routine using the rules shown in FIG. 2.

Processing for identifying a faulty system component according to one embodiment of the present invention is illustrated in FIG. 4 in which the fault identification rules defined by the table shown in FIG. 2 are implemented. Initially, the fault status of the far-end system is obtained together with the alarm status of the active and standby receivers and the active transmitter as shown at boxes 202–203. At decision box 210 the statuses of the active and standby receivers are checked to determine if there is a simultaneous alarm condition. If both receivers indicate a fault, then the conclusion that the far-end transmitter has failed is drawn at process box 212, that status being provided as an output at process box 230. If, however, only one receiver is in an alarm condition, then the decision at 214 results in a conclusion that the near-end receiver providing the alarm has failed.

If neither receiver of the redundant pair indicates a fault condition, then processing continues at decision box 218 to determine if the active transmitter indicates a fault. If so, a signal received from the far-end is checked at decision 220 to determine if both far-end receivers have lost signal. A complete loss of signal by the far-end leads to a conclusion at 222 that the near-end transmitter has failed. It shall be appreciated that the determination of local transmitter failure may be omitted, if desired, such as where reliance on the transmission of a fault condition signal from the far end system is satisfactory. However, the preferred embodiment including the local testing of the transmitter circuitry to provide additional system reliability, such as where active transmitters at both the new and far ends fail substantially simultaneously or where an added check on transmitter failure is desired such as for an added level of alarm condition, such as to cause an operator alarm.

If none of the above conditions has been satisfied, then a conclusion is reached at process 224 that no faults are present in the system. However, certain contradictory conditions may be left unresolved as illustrated by processing error 226. Therein, an active transmitter fault has been detected but no loss of signal has been indicated by the far-end system. This may be due to an erroneous fault detected in the near-end active transmitter, a processing error, failure of the far-end system to communicate the fault, or other conditions which will need further processing to resolve. Further, although not shown in the flow diagram, receipt of a far-end dual receiver alarm may initiate fault processing even without prior detection of a local active transmitter fault.

Figure 5:
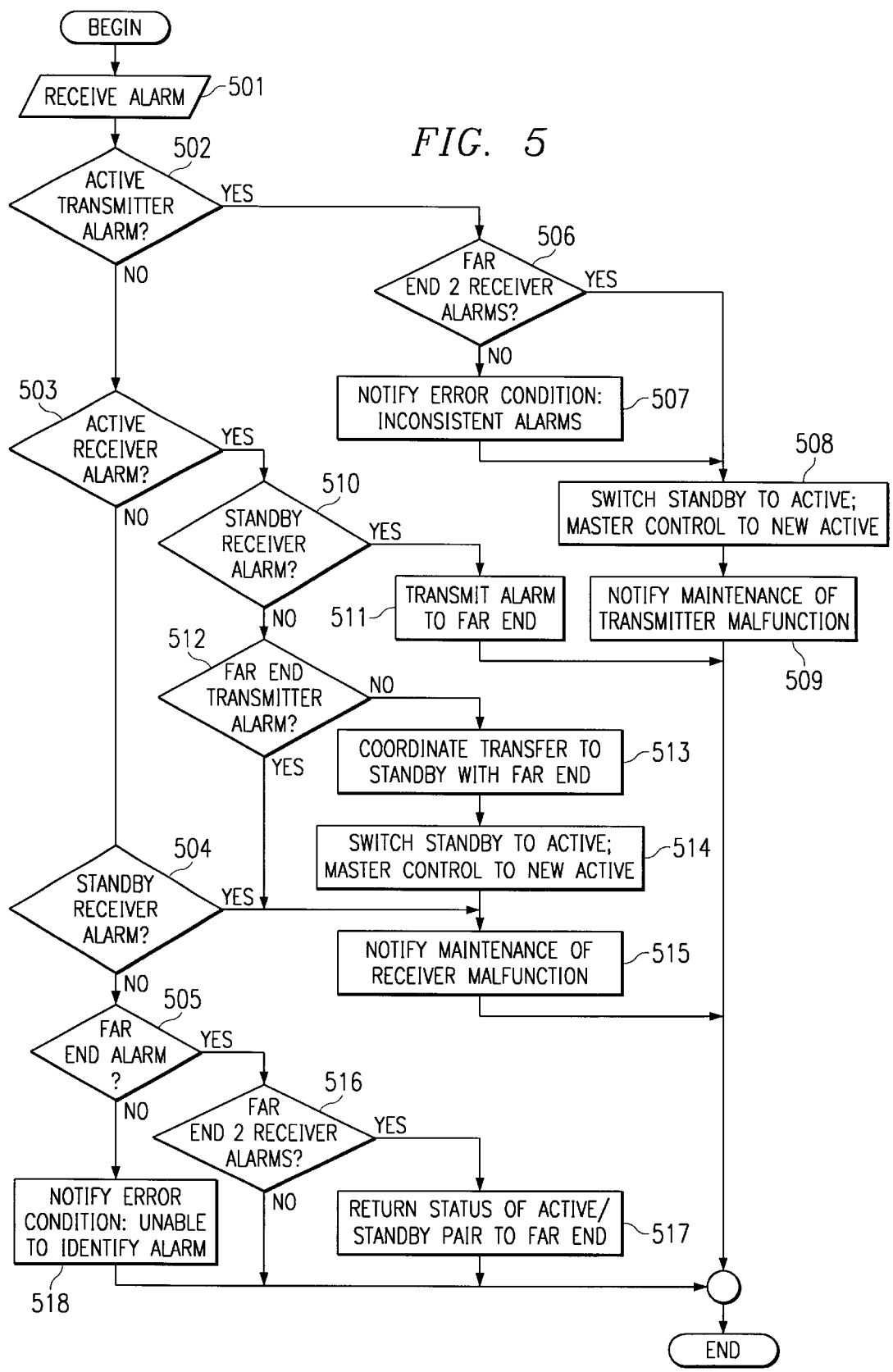
FIG. 5 is a flow diagram of a procedure used by a radio transceiver controller for identifying faults and transferring control functions to and from other controllers.

A process for controlling a redundant pair of transceivers according to the fault identification rules just described is shown in FIG. 5 of the drawings. Upon receipt of an alarm condition by the master processor at box 501, the form of the alarm is identified through a series of decision boxes (boxes 502–505) with appropriate branches taken to resolve the situation. As a result of a first decision point (box 502), if a transmitter alarm has been received the process then determines if the far-end has reported a dual receiver alarm (box 502). If it has not, then appropriate error processing is performed, shown in the flow diagram as reporting the existence of inconsistent alarm statuses (box 507). In either case, receipt of an active transmitter alarm preferably results in activation of the standby radio transceiver to active mode (box 508) and corresponding switching of the failed active transceiver to an inactive standby mode (box 509). Master control is also preferably transferred to the new active transceiver and an appropriate maintenance notification is performed.

If an alarm has been received from the active receiver (box 503), then a second test is performed to see if the standby receiver has also lost reception (box 510). If both receivers have lost reception, then an alarm is transmitted to the far-end at box 511 indicating that the far-end transmitter has failed. If, however, the active receiver has a reception fault but the standby receiver does not, then a check may be made to see if the far-end transmitter is in an alarm condition at box 512. If the far-end is still transmitting, and only the active receiver is providing a fault condition (i.e., has failed), then the active radio transceiver coordinates with the far-end prior to bringing up the standby transmitter at box 513. Upon receiving acknowledgment by the far-end, the standby radio transceiver is switched to an active mode of operation (i.e., both transmitter and receiver portions) and, conversely, the active transceiver is placed in a standby mode of operation at box 514. At the same time, master control is passed to the new active transceiver and the switch is completed. Maintenance is then notified (box 515) of the receiver malfunction so that appropriate action can be taken. Conversely, if the standby receiver does not indicate an alarm condition while the active receiver indicates a reception fault and the far-end transmitter is down, then maintenance is notified (box 515) of the standby receiver's failure to detect and indicate an alarm condition.

If the standby receiver indicates a fault condition while no such fault is detected by the active receiver (box 504), then maintenance is notified that there is a fault in the standby receiver at box 515.

Receipt of a far-end alarm (box 505) and, in particular, an indication that there has been a signal loss at both far-end receivers (box 516), results in a return of status of the active and standby pair to the far-end at box 517. Although not shown, receipt of a far-end alarm may be subject to the same processing as for an active transmitter alarm or to some other error processing to determine why no active transmitter alarm was generated. Finally, if the alarm condition has not been identified, appropriate notification is provided that an error condition exists at box 518.

Figure 6:
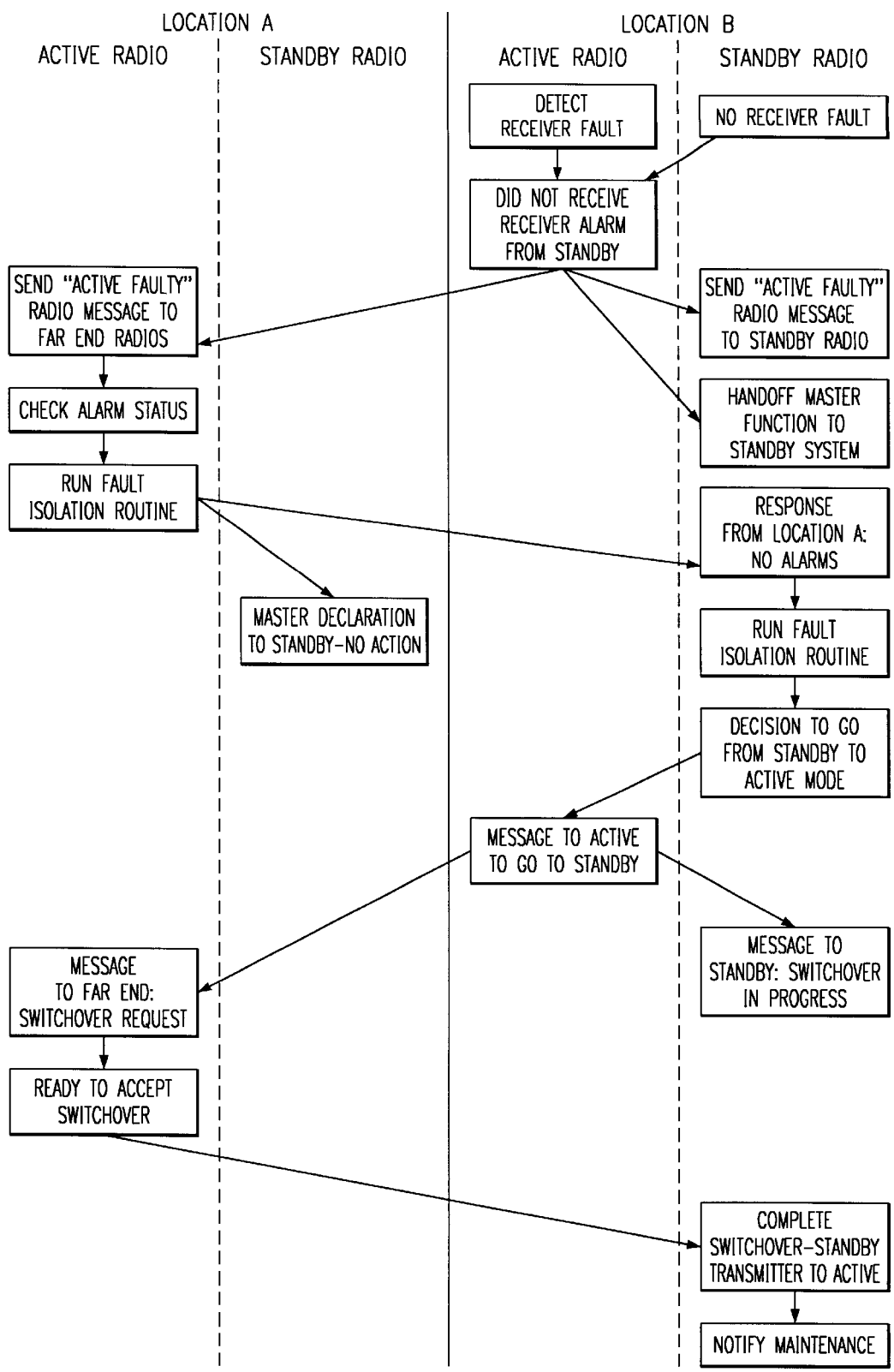
FIG. 6 is a diagram showing processing performed by, and the interaction between, redundant pairs of radio transceivers in response to a failure of a receiver in one of the active radio transceivers.

An example of processing upon detection of a receiver fault of a preferred embodiment is illustrated in the processing diagram of FIG. 6. In this example, a receiver fault is detected in the active radio of the radio transceiver pair at location B without detecting a receiver fault in the standby radio. Upon detecting the receiver fault, the active radio sends a receiver alarm signal to the active radio at location A using its RF or other control channel link and, over the interface to the colocated standby radio transceiver at location B. Simultaneously, the active radio preferably hands off the master control function to the standby system. Since the active system is experiencing a fault in one module and may also suffer a fault in another module such as the controller.

In response to receipt of the receiver fault alarm, the active radio at location A preferably performs an alarm status check and runs a fault isolation routine, determining in this example that there are no alarm conditions at location A and providing a corresponding response to location B which is received by the standby radio. The active radio at location A also issues a master declaration to its standby transceiver indicating that the latter should maintain a standby mode of operation, no further action being required.

Upon receiving the alarm status from the far-end, the standby radio transceiver at location B runs the fault isolation routine and, as a result, concludes that the standby radio transceiver should be placed in the active mode. An appropriate message is sent to the active radio transceiver instructing it to go to a standby mode which, in turn, transmits an appropriate message via its still active transmitter to far-end location A coordinating the switch over. In response, location A signals that it is ready to accept the switch over. Simultaneously, the active radio transceiver at location B signals the standby radio transceiver that the switch over is in progress. Finally, upon receipt by the standby radio transceiver of the ready indicator from location A, standby radio transceiver B completes the switch over, transitioning to active status mode, bringing up its transmitter and notifying maintenance of the problem.

Figure 7:
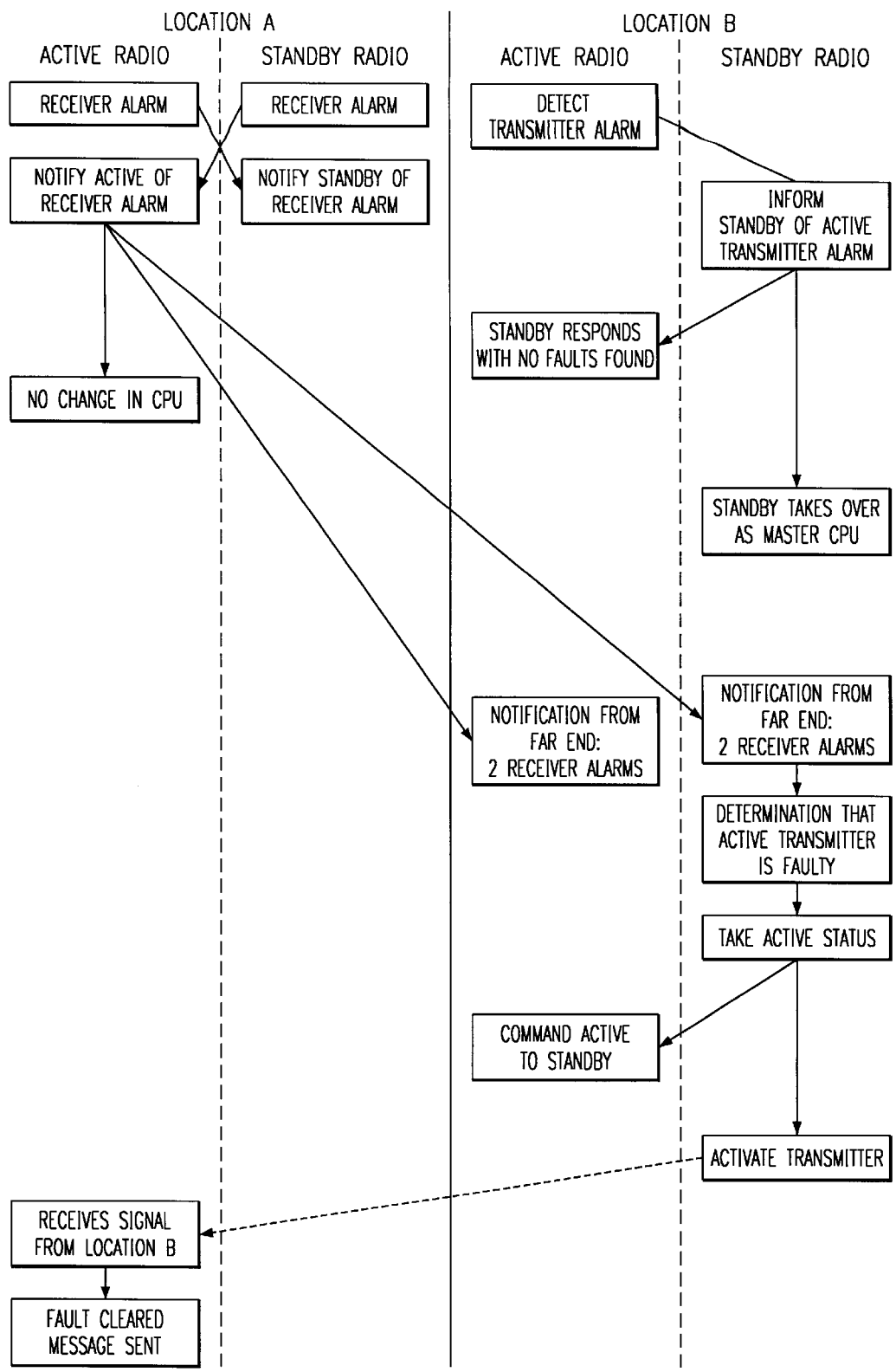
FIG. 7 is a diagram of processing performed by pairs of radio transceivers in response to a failure of the transmitter portion of an active radio transceiver.

FIG. 7 illustrates processing initiated upon failure of the active transmitter at location B. Preferably, upon detection of a transmitter alarm, an appropriate message is sent to the standby transceiver which responds to the active radio transceiver with a message that no faults have been found by the standby radio transceiver. The standby radio transceiver then preferably takes over the master control function. Simultaneously, in response to loss of the received signal at location A, both the active and standby radio transceivers generate receiver alarm messages which are exchanged by the two radio transceivers. Because both receivers have lost signal, there is no change in the location A control status, however, the active radio transceiver preferably transmits a message to location B indicating that it has experienced a complete loss of received signal. Upon receipt of the alarm message by the standby receiver at location B, a determination is made that the active transmitter is faulty in accordance with the previously described fault isolation rule. This determination results in the standby radio transceiver turning itself into an active unit and instructing the faulty radio transceiver to go into standby mode. The standby radio transceiver then activates its transmitter and reestablishes the link from location B to location A which, in response, informs other radios in the network that the alarm condition has been cleared.

Figure 8:
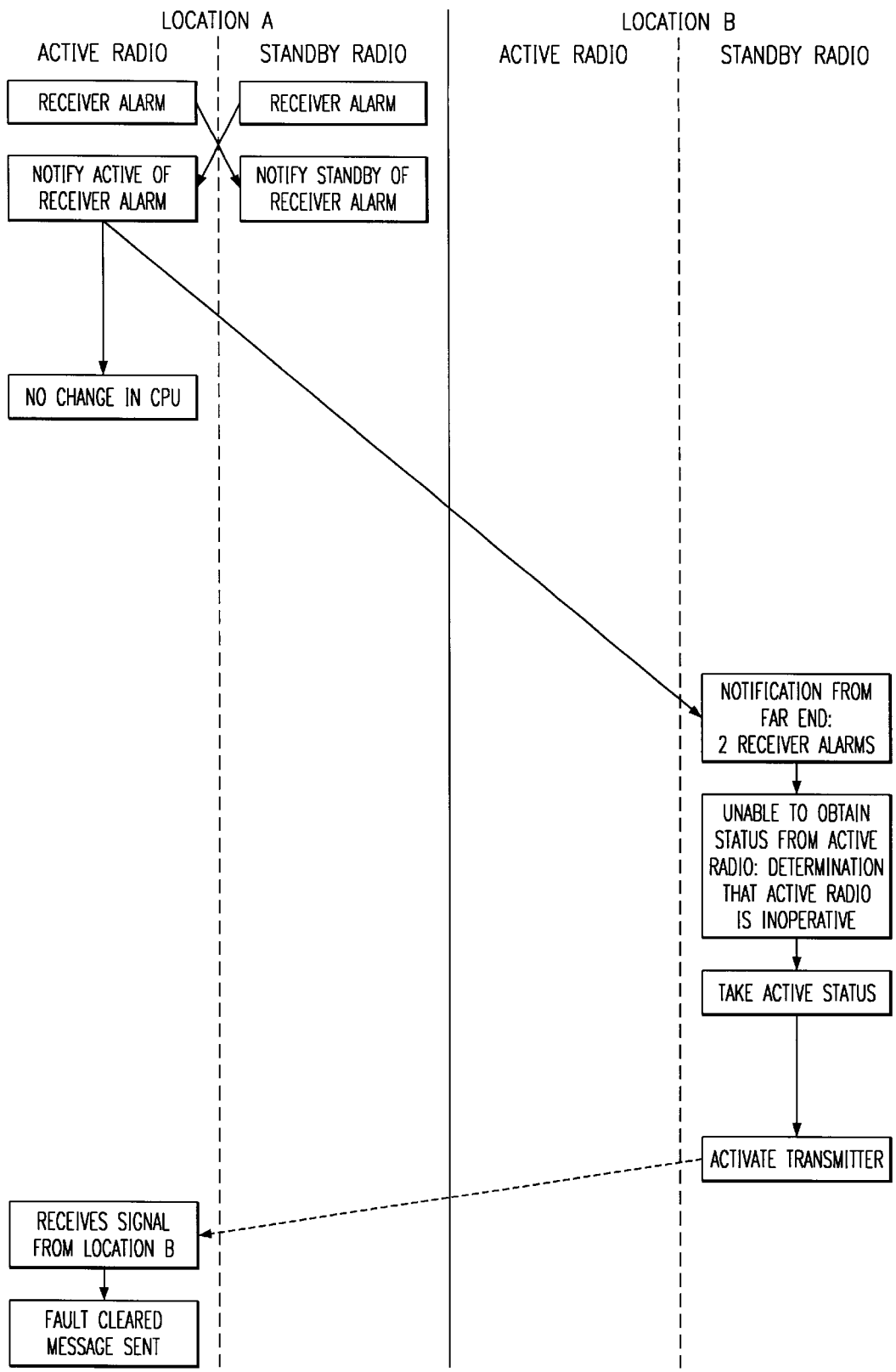
FIG. 8 is a diagram showing the processing in response to the failure of a processor of an active radio transceiver.

Processing resulting from a controller or power failure of the active radio at location B is illustrated in FIG. 8. Upon complete failure of the active radio at location B and subsequent loss of signal at location A, receiver alarms are generated by both the active and standby receivers at location A. As previously described, because both receivers have generated alarms, no change is made to the controller status at location A in the preferred embodiment, but a message is transmitted from location A to location B indicating that there has been a total loss of received signal. The standby radio at location B unsuccessfully attempts to communicate with the active radio transceiver and, in response, makes the determination that the active radio transceiver is inoperative. The standby radio transceiver at location B then activates its controller as the master and transitions to active status, activating its transmitter and providing an appropriate output from its receiver. Upon receipt of signal at location A, the active radio at location A sends a fault cleared message to the rest of the network.

In addition to detecting, isolating, and providing suitable activation of standby equipment to provide continuous communication between system nodes, several switching strategies may be implemented for continuation of service. In particular, switching may be accomplished (i) one radio at a time, (ii) one radio-link pair at a time, and/or (iii) one rooftop radio pair (i.e., back-to-back transceiver pairings) at a time.

Figure 9A:
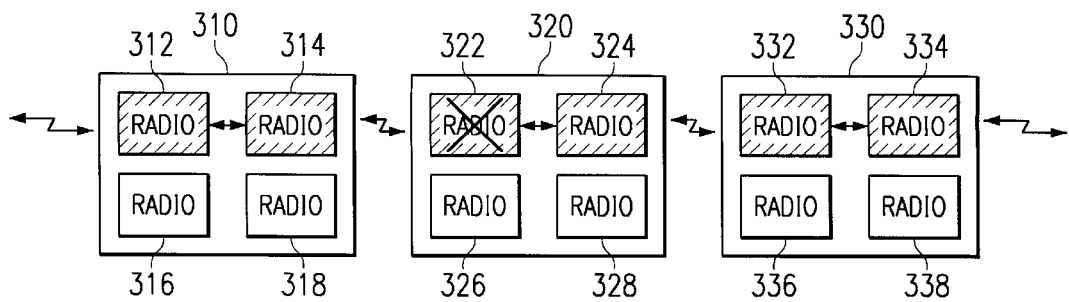
FIGS. 9A–9B are block diagrams of a "one radio at a time" switching strategy performed in response to failure of an active radio transceiver.
Figure 9B:
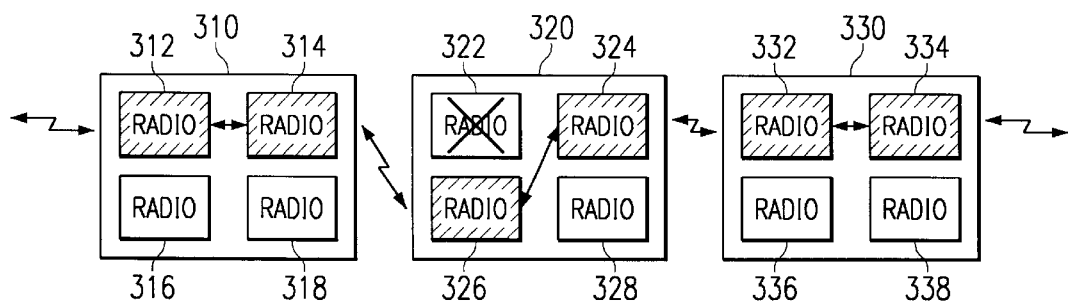

The one radio at a time strategy is depicted in FIGS. 9A–9B wherein when the near-end active radio 322 fails (FIG. 9A), service is switched to its standby radio 326 (FIG. 9B). The prior node 310 and subsequent node 330, however, are unaffected.

Figure 10A:
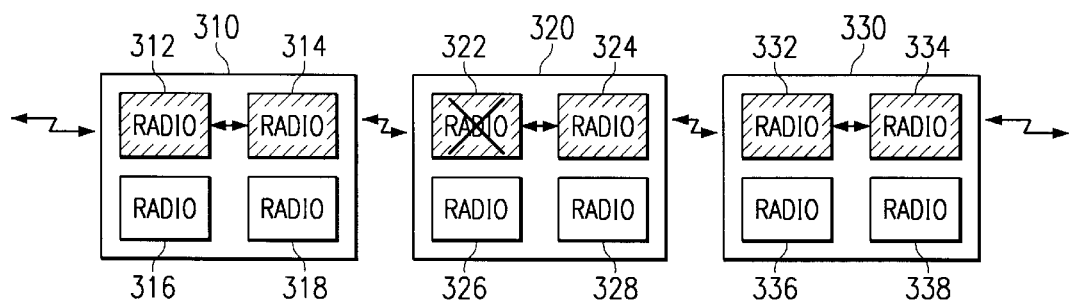
FIGS. 10A–10B are block diagrams of switching performed using a "one radio-link pair at a time" switching strategy in response to the failure of an active radio transceiver.
Figure 10B:
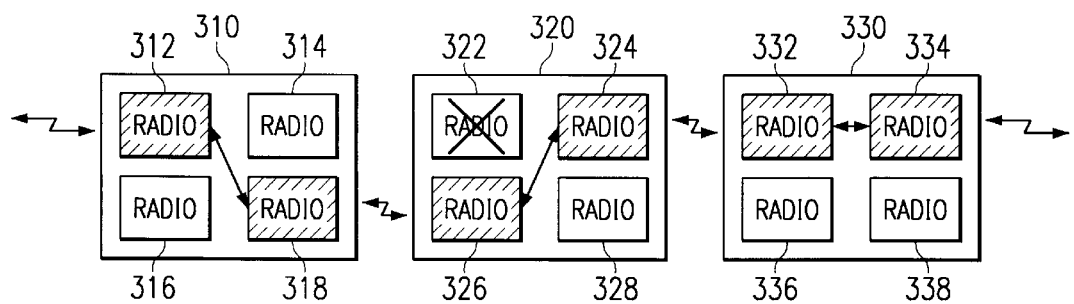

An alternative one radio-link pair at a time switching scheme is shown in FIGS. 10A–10B wherein each radio transceiver of a redundant pair is itself paired with a radio transceiver at a far-end site. For example, radio 322 at site 320 is paired with a corresponding radio 314 at prior site 310 while radio 324 is paired with radio 332 of subsequent site 330. Likewise, radios 318 and 326 are paired together while radios 328 and 336 are paired. Such a pairing might be appropriate, for example, if the radios are sited so that optimal performance may be achieved by assigning specific radios to particular links or paths. Thus, upon failure of active transceiver 322 at site 320 (FIG. 10A) standby receiver 326 is pressed into service (FIG. 10B). Simultaneously, active transceiver 314 at site 310 is likewise placed in a standby mode and, instead, inactive receiver 318 becomes the active transceiver at site 310. The resulting configuration is shown in FIG. 10B.

Figure 11A:
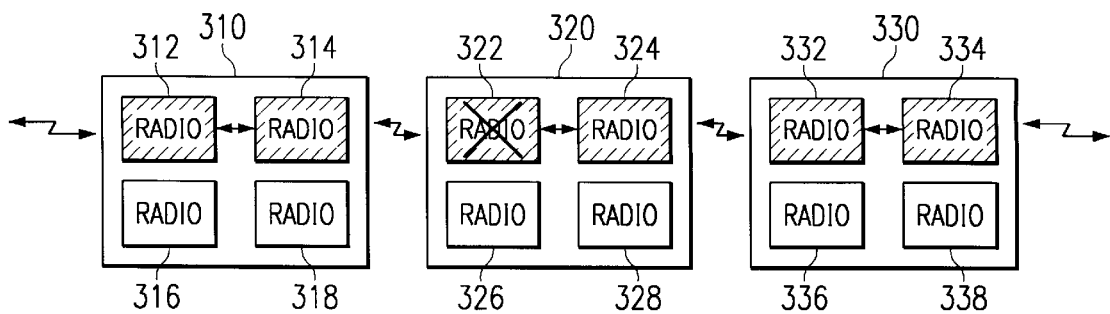
FIGS. 11A–12B are block diagrams showing switching performed using a "radio pair at a time" switching strategy in response to failure of an active radio transceiver.
Figure 11B:
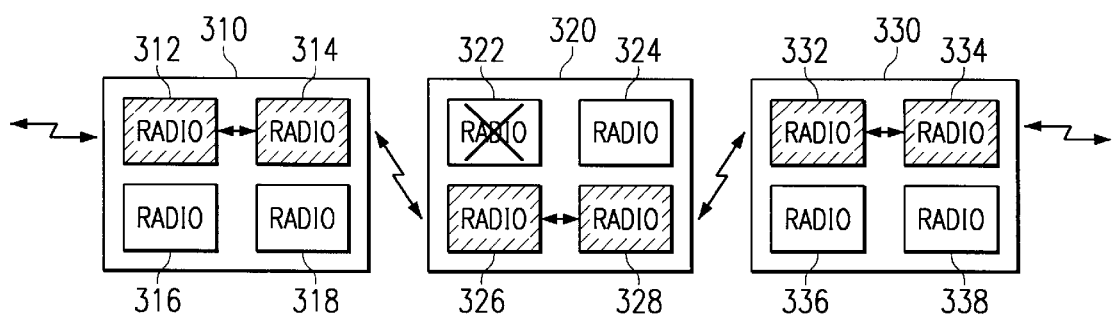

A third switching strategy is shown in FIGS. 11A–11B wherein each transceiver of a redundant pair is matched to a corresponding transceiver at that site. For example, referring to FIG. 11A, transceiver 322 at node 320 is matched to transceiver 324 and, likewise, transceiver 326 is matched with transceiver 328. This configuration is particularly useful in rooftop configurations wherein colocated pairs of forward and reverse looking radios are maintained and operated as a unit. Thus, upon failure of transceiver 322 (FIG. 11A), standby transceiver 326 and standby transceiver 328 are pressed into service (FIG. 11B), thus, those radio transceivers become active as transceivers 326 and 328.

Figure 12A:
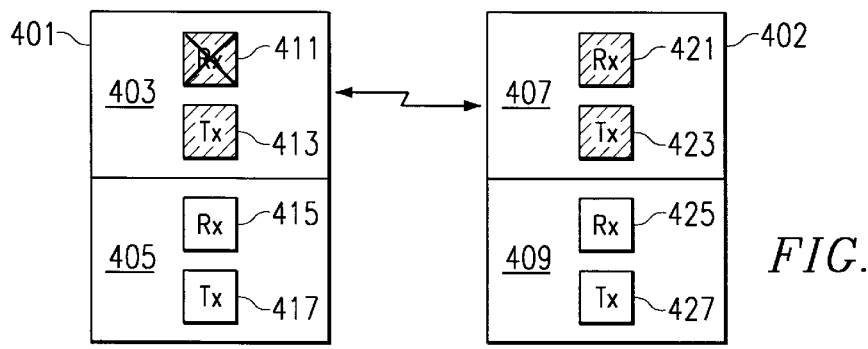
Figure 12B:
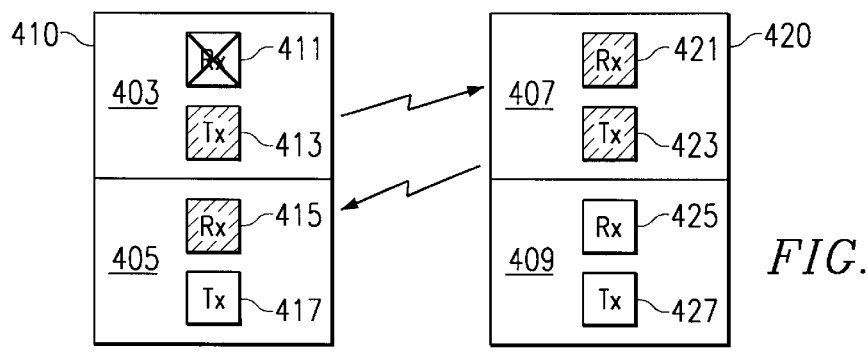

Although described above with reference to altering the status of a transcriber unit from standby to active upon the detection of a fault of a module at an originally active transceiver of a redundant pair, the present invention may be operated to place modules into and our of active service, if desired. For example, as shown in FIGS. 12A–12B, individual receiver modules of a transceiver redundant pair may be switched in status. Referencing FIG. 12A, nodes 401 and 402 each have a transceiver redundant pair, pair 403 and 405 and pair 407 and 409 respectively. Each transceiver includes receiver and transmitter circuit modules that are operable substantially independent of one another. Specifically, transceiver 403 includes receiver module 411 and transmitter module 413, transceiver 405 includes receiver module 415 and transmitter module 427. Upon failure of receiver module 411 of transceiver 403 at node 401 (FIG. 12A), receiver module 405 of transceiver module 405 of transceiver 405 at node 401 may be placed into service (FIG. 12B) while transmitter module 413 of transceiver 403 remains in service. This change in module status may be accomplished with no change in module status at node 402 (as shown in FIG. 12B) or with a corresponding change in operational status between transmitter modules 423 and 427 (not shown), if desired.

Although several embodiments of the invention have been described in detail above, it should be clear that the present invention is capable of numerous modifications as would be apparent to one of ordinary skill in the art. Such modifications fall within the purview of the appended claims. For example, the invention is equally applicable to module level standby activation such as might be accomplished with separate transmitter and receiver modules.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A system for use in providing reliable communications between a first communication site and a second communication site of a communication link, the system comprising:
    a transmitter including a first transmitter module and a second transmitter module each selectively operable in active and standby modes of operation, wherein said standby mode of operation processes an input signal for transmission through at least a portion of one of said first and second transmitter modules in said standby mode without transmitting the processed signal as in the active mode;
    a receiver;
    a receiver monitor providing an alert signal upon loss of reception of a received signal at said receiver; and
    a controller operable to control said first transmitter module and said second transmitter module to operate in said active and standby modes of operation in response to a signal from said receiver monitor.

2. The system of claim 1, wherein said controller is operable to control said first transmitter module and said second transmitter module to operate in said active and standby modes of operation in response to a signal from said receiver monitor, wherein said signal from said receiver monitor controlling said transmitter modules indicates a malfunction of two receiver modules of said receiver.

3. The system of claim 2, wherein said controller comprises a first transmitter controller module associated with said first transmitter module and a second transmitter controller module associated with said second transmitter module, wherein said system further comprises an interface for coupling a signal between said first transmitter controller module and said second transmitter controller module to facilitate the selective operation of said first and second transmitter modules in said active and standby modes of operation.

4. The system of claim 3, wherein said first transmitter controller module and said second transmitter controller module provide controller redundancy, and wherein one of said first transmitter controller module and said second transmitter controller module is selectively operable as a master receiver controller controlling the other one of said first transmitter controller module and said second transmitter controller module.

5. The system of claim 4, wherein said master receiver controller is the transmitter controller module associated with a one of said first transmitter module and said second transmitter module in an active mode.

6. The system of claim 1, wherein said signal from said receiver monitor indicates malfunction of at least two receiver modules of said receiver.

7. The system of claim 6, wherein said receiver comprises:
    a first receiver module and a second receiver module each selectively operable in active and standby modes of operation, wherein said standby mode of operation processes an received signal through at least a portion of one of said first and second receiver modules in said standby mode without outputting the processed signal as in the active mode.

8. The system of claim 7, wherein said controller is operable to control said first receiver module and said second receiver module to operate in said active and standby modes of operation in response to a signal from said receiver monitor, wherein said signal from said receiver monitor controlling said receiver modules indicates a malfunction of one of said first and second receiver modules while there is no malfunction of another of said first and second receiver modules.

9. The system of claim 7, wherein said controller comprises a first receiver controller module associated with said first receiver module and a second receiver controller module associated with said second receiver module, wherein said system further comprises an interface for coupling a receiver monitor signal between said first receiver controller module and said second receiver controller module to facilitate the selective operation of said first and second receiver modules in said active and standby modes of operation.

10. The system of claim 9, wherein said first receiver controller module and said second receiver controller module provide controller redundancy, and wherein one of said first receiver controller module and said second receiver controller module is selectively operable as a master receiver controller controlling the other one of said first receiver controller module and said second receiver controller module.

11. The system of claim 10, wherein said master receiver controller is the receiver controller module associated with a one of said first receiver module and said second receiver module in an active mode.

12. The system of claim 1, further comprising a transmitter monitor providing an alert signal upon malfunction of an output of a transmit signal at said transmitter, said controller being further operable to control said first transmitter module and said second transmitter module to operate in said active and standby modes of operation in response to a signal from said transmitter monitor.

13. The system of claim 1, wherein said transmitter includes a load selectively attenuating an output of one of said first and second transmitter modules when said one of said first and second transmitter module is operating in said standby mode of operation.

14. The system of claim 1, wherein first and second communication sites constitute a segment of a microwave communications network.

15. The system of claim 1, wherein said controller is responsive to a set of stored instructions implementing predetermined rules for isolating failures of redundant transmitters including said first and second transmitter modules.

16. A system for use in providing reliable communications between a first communication site and a second communication site of a communication link, the system comprising:
    a receiver including a first receiver module and a second receiver module each selectively operable in active and standby modes of operation, wherein said standby mode of operation processes a received signal through at least a portion of one of said first and second receiver modules in said standby mode without outputting the processed signal as in the active mode;

a transmitter;

a receiver monitor providing an alert signal upon loss of reception of a received signal at said receiver; and a controller operable to control said first receiver module and said second receiver module to operate in said active and standby modes of operation in response to a signal from said receiver monitor, wherein said controller is operable to control said first receiver module and said second receiver module to maintain operation in a previous configuration of active and standby modes of operation in response to a signal from said receiver monitor which indicates a receive error at both said first and second receiver modules.

17. The system of claim 16, wherein said controller comprises a first receiver controller module associated with said first receiver module and a second receiver controller module associated with said second receiver module, wherein said system further comprises an interface for coupling a signal between said first receiver controller module and said second receiver controller module to facilitate the selective operation of said first and second receiver modules in said active and standby modes of operation.

18. The system of claim 17, wherein said first receiver controller module and said second receiver controller module provide controller redundancy, and wherein one of said first receiver controller module and said second receiver controller module is selectively operable as a master transmitter controller controlling the other one of said first receiver controller module and said second receiver controller module.

19. The system of claim 18, wherein said master transmitter controller is the receiver controller module associated with a one of said first receiver module and said second receiver module in an active mode.

20. The system of claim 16, wherein said transmitter comprises:

first transmitter module and a second transmitter module each selectively operable in active and standby modes of operation, wherein said standby mode of operation processes an input signal for transmission through at least a portion of one of said first and second transmitter modules in said standby mode without transmitting the processed signal as in the active mode.

21. The system of claim 20, wherein said controller is operable to control said first transmitter module and said second transmitter module to operate in said active and standby modes of operation in response to a signal from said receiver monitor, wherein said signal from said receiver monitor controlling said transmitter modules indicates a malfunction of both of said first and second receiver modules.

22. The system of claim 20, wherein said controller comprises a first transmitter controller module associated with said first transmitter module and a second transmitter controller module associated with said second transmitter module, wherein said system further comprises an interface for coupling a transmitter monitor signal between said first transmitter controller module and said second transmitter controller module to facilitate the selective operation of said first and second transmitter modules in said active and standby modes of operation.

23. The system of claim 22, wherein said first transmitter controller module and said second transmitter controller module provide controller redundancy, and wherein one of said first transmitter controller module and said second transmitter controller module is selectively operable as a master transmitter controller controlling the other one of said first transmitter controller module and said second transmitter controller module.

24. The system of claim 23, wherein said master transmitter controller is the transmitter controller module associated with a one of said first transmitter module and said second transmitter module in an active mode.

25. The system of claim 16, further comprising a transmitter monitor providing an alert signal upon malfunction of an output of a transmit signal at said transmitter.

26. The system of claim 16, wherein said receiver includes a load selectively attenuating an output of one of said first and second receiver modules when said one of said first and second receiver module is operating in said standby mode of operation.

27. The system of claim 16, wherein first and second communication sites constitute a segment of a microwave communications network.

28. The system of claim 16, wherein said controller is responsive to a set of stored instructions implementing predetermined rules for isolating failures of redundant receivers including said first and second receiver modules.

29. A radio transceiver for use as one of a pair of redundant radio transceivers at a first communication site which communication site is in communication with a second communication site of a communication system, the radio transceiver comprising:

a radio transmitter selectively operating in active and standby modes of operation;

a radio receiver;

a receiver monitor responsive to said radio receiver providing an alert signal upon loss of reception of a radio signal; and a controller (i) controlling said radio transmitter to operate in said active and standby modes of operation in response to a pair of remote transceivers located at said second communication site detecting a failure of one of said pair of redundant transceivers at said first communication site, and (ii) responsive to said receiver monitor and to a signal from a receiver monitor of the other of the pair of redundant transceivers at said first communication site for supplying a transmitter failure signal to said pair of remote transceivers located at said second communication site.

30. The radio transceiver according to claim 29 further comprising an output for selectively providing a signal from said radio receiver in response to (i) said receiver monitor and (ii) said signal from said receiver monitor of the other of the pair of redundant transceivers at said first communication site.

31. The radio transceiver according to claim 29 further comprising a transmitter monitor for detecting an output of said radio transmitter, said controller responsive to said transmitter monitor for providing a control signal to the other of the pair of redundant transceivers at said first communication site.

32. The radio transceiver according to claim 29 wherein said radio transmitter includes a dummy load selectively attenuating an output of said radio transmitter when operating in said standby mode of operation.

33. The radio transceiver according to claim 29 wherein first and second communication sites constitute a segment of a point-to-point microwave communications network.

34. The radio transceiver according to claim 29 wherein said radio transmitter and radio receiver are operable to emit and detect transmission at radio frequencies of 1 GHZ and above.

35. The radio transceiver according to claim 29 wherein said controller is responsive to a set of stored instructions implementing a predetermined rule for isolating failures of the pair of redundant transceivers at said first communication site and the pair of remote transceivers at said second communication site.

36. A radio transceiver system for use at a communications node of a radio communication system, said redundant radio transceiver system comprising:
 first and second radio transceivers, each including
  (i) a transmitter selectively operable in standby and active modes of operation;
  (ii) a receiver; and
  (iii) a controller operative to (a) monitor said receiver and, in response, provide a receiver status indicator, (b) provide a remote transmitter failure signal responsive to said receiver status indicator and to the receiver status indicator of the other one of said first and second radio transceivers, and (c) control said transmitter to selectively operate in said standby and active modes in response to a remote transmitter failure signal of another redundant radio transceiver system.

37. The radio transceiver system according to claim 36, wherein said receiver is selectively operative in an active and a standby mode of operation in response to said receiver status indicators.

38. The radio transceiver system according to claim 36, wherein said controllers of said first and second radio transceivers are in communication to operate (i) one of said controllers in a master mode for providing said remote transmitter failure signal and (ii) the other controller in a slave mode for providing a respective receiver status indicator to said controller operated in said master mode.

39. The radio transceiver system according to claim 36 wherein said receiver status indicators include a loss of signal condition and wherein said controller of one of said first and second transceivers receives said receiver status indicator of the other of said first and second transceivers and, in response to said receiver status indicators of both said first and second transceivers, determines that (i) there has been a failure of a remotely transmitted signal in response to said receiver status indicators of both said first and second transceivers indicating said loss of signal condition and (ii) there had been a receiver failure of a one of said first and second transceivers corresponding to a loss of signal indicator wherein the status indicator of the other one of said first and second transceivers does not indicate a loss of signal.

40. The radio transceiver system according to claim 36 wherein each of said transmitters and receivers are operable at radio frequencies of 1 GHz and above.

41. A communication system for providing communication between a plurality of nodes, said system comprising:
 a first node pair of redundant radio units adapted to provide communication with a radio unit of a second node of said plurality of nodes; and
 each radio unit of said first node pair of redundant radio units including
  a radio frequency transducer selectively operable in standby and active modes of operation; and
  a controller operative in master and slave modes, wherein said master mode is operative to selectively monitor said transducers of said first node pair and in response control the operating modes of said transducers to selectively operate in said standby and active modes.

42. The system of claim 41, wherein said radio units of said first node pair include substantially the same components and are interchangeable with one another.

43. The system of claim 41, wherein said radio units are coupled together to provide communication redundancy utilizing no external active components.

44. The system of claim 43, wherein a component coupling said radio units with respect to a user data link is a passive coupler.

45. The system of claim 41, wherein said transducer is a radio receiver.

46. The system of claim 41, wherein said transducer is a radio transmitter.

47. The system of claim 41, wherein said transducer is a radio transceiver.

48. The system of claim 41, wherein operation of a controller in said master mode to control the operating mode of a transducer of that radio unit to operate in said standby mode also operates to place said controller in said slave mode.

49. The system of claim 48, wherein operation of said controller in said master mode to control the operating mode of said transducer of that radio unit to operate in said standby mode also operates to place said controller of another radio unit of said first node pair to operate in said master mode.

50. The system of claim 41, further comprising:
 a second node pair of redundant radio units adapted to provide communication with a radio unit of a third node of said plurality of nodes, wherein said first node pair and said second node pair provide a communication link between said second and third nodes; and
 each radio unit of said second node pair of redundant radio units including
  a radio frequency transducer selectively operable in standby and active modes of operation; and
  a controller operative in master and slave modes, wherein said master mode is operative to selectively monitor said transducers of said first node pair and in response control the operating modes of said transducers to selectively operate in said standby and active modes.

51. A communication system comprising a plurality of nodes, at least one of said nodes comprising:
 a first pair of redundant radio transceivers in radio communications with a prior one of said nodes; and
 a second pair of redundant radio transceivers in radio communications with a subsequent one of said nodes;
 each of said pair of redundant radio transceivers including
  (i) a transmitter selectively operable in standby and active modes of operation;
  (ii) a receiver; and
  (iii) a controller operative in master and slave modes to selectively (a) monitor said receiver and, in response, provide a receiver status indicator, (b) provide a remote transmitter failure signal responsive to said receiver status indicator and to the receiver status indicator of the other one of said pair of redundant radio transceivers, and (c) control the operating modes of said transmitters of said pair of redundant radio transceiver to selectively operate in said standby and active modes in response to a remote transmitter failure signal provided by an associated one of said previous and subsequent nodes.

52. The communication system according to claim 51 wherein one of each of said pair of redundant radio transceivers is selectively operated in an active mode of operation while the other one of each of said pair of redundant radio transceivers is operated in a standby mode of operation, the radio transceivers of the first and second pair of redundant radio transceivers operated in said active modes being connected to communicate data between said previous and subsequent nodes.

53. The communication system according to claim 51 wherein each of said nodes comprises a microwave radio station operable at radio frequencies of 1 GHz and above.

54. The communication system according to claim 52 including switching means responsive to a change of mode of one of said pair of redundant radio transceivers for selectively operating the other pair of redundant radio transceivers in corresponding ones of said standby and active modes of operation.

55. The communication system according to claim 52 including switching means responsive to a change of mode of one of said pair of redundant radio transceivers for selectively operating a third pair of redundant radio transceivers at an associated one of said prior and subsequent nodes in corresponding ones of said standby and active modes of operation.

56. A method of operating a radio communication network including a plurality of nodes, each node including first and second pairs of radio transceivers wherein one radio transceiver of each of said pair of radio transceivers is operated in an active mode and the other in a standby mode, said method comprising the steps of:

identifying signals transmitted to each of the first and second pairs of radio transceivers;

determining an operational status of a receiver portion of each of said radio transceivers of said first and second pairs of radio transceivers in response to a dissimilarity of signals identified by respective pairs of radio transceivers;

determining an operational status of a remote node in response to a failure to receive a signal from said remote node by an associated one of said pairs of transceivers; and selectively changing the operating mode of ones of said pairs in response to said determining steps.

57. A method of operating a radio communication network including first and second terminal nodes and an intermediate relay node, said first and second terminal nodes each comprising a pair of radio transceivers and said relay node comprising two pairs of radio transceivers, one radio transceiver of each of said pairs being operated in an active mode while the other transceiver is operated in a standby mode, said first and second terminal nodes communicating with each other through said relay node, said method comprising the steps of:

detecting an alarm condition caused by one radio transceiver of a subject pair of transceivers losing signal reception;

interrogating the other transceiver of the subject pair to identify a corresponding loss of signal reception by the other transceiver;

applying a predetermined rule to determine which of a receiver failure and a transmitter failure has most likely occurred; and switching operational modes of one of said pairs of transceivers in response to said determination.

58. The method according to claim 57 further comprising the step of transferring a control of said one of said pairs of transceivers.

\* \* \* \* \*